United States Patent
Stuhlmann et al.

(10) Patent No.: US 11,046,529 B2
(45) Date of Patent: Jun. 29, 2021

(54) DEVICE AND METHOD FOR ORIENTING PACKAGES

(71) Applicant: KHS GmbH, Dortmund (DE)

(72) Inventors: Christopher Stuhlmann, Korbach (DE); Norman Pau, Kleve (DE); Lothar Wess, Kleve (DE); Manfred Berg, Emmerich (DE); Johannes Look, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/644,195

(22) PCT Filed: Sep. 3, 2018

(86) PCT No.: PCT/EP2018/073591
§ 371 (c)(1),
(2) Date: Mar. 4, 2020

(87) PCT Pub. No.: WO2019/048368
PCT Pub. Date: Mar. 14, 2019

(65) Prior Publication Data
US 2021/0061576 A1 Mar. 4, 2021

(30) Foreign Application Priority Data
Sep. 8, 2017 (DE) .................... 10 2017 120 730.9

(51) Int. Cl.
*B65G 43/08* (2006.01)
*B65G 15/12* (2006.01)
*B65G 47/244* (2006.01)

(52) U.S. Cl.
CPC ............. *B65G 43/08* (2013.01); *B65G 15/12* (2013.01); *B65G 47/2445* (2013.01);
(Continued)

(58) Field of Classification Search
CPC .... B65G 43/08; B65G 15/12; B65G 47/2445; B65G 2203/0225; B65G 2203/0291; B65G 2203/041
(Continued)

(56) References Cited

U.S. PATENT DOCUMENTS 4,807,739 A * 2/1989 Wolf ................... B65G 47/2445
198/415
4,838,408 A * 6/1989 Brawn ............... B65G 47/2445
198/434
(Continued)

FOREIGN PATENT DOCUMENTS

DE 102011116535 A1 4/2013
EP 0458580 A1 11/1991
(Continued)

OTHER PUBLICATIONS

Google "PAtent Translate Description EP 1180484 A2". (Year: 2021).*

*Primary Examiner* — Mark A Deuble
(74) *Attorney, Agent, or Firm* — Occhiuti & Rohlicek LLP

(57) ABSTRACT

Using a transporter to either transport a first package or to simultaneously transport several packages, one of which is the first package includes using a double conveyor of the transporter to execute a first rotational movement of at least the first package, using a monitor, detecting an actual orientation of the first package, comparing an actual orientation of the first package with a predetermined setpoint orientation, detecting a deviation between the actual orientation and the setpoint orientation, and causing the transporter to carry out a second rotation of the first package.

15 Claims, 2 Drawing Sheets

(52) U.S. Cl.
CPC ........... *B65G 2203/0225* (2013.01); *B65G 2203/0291* (2013.01); *B65G 2203/041* (2013.01)

(58) Field of Classification Search
USPC .............................................. 198/415, 623
See application file for complete search history.

(56) References Cited

U.S. PATENT DOCUMENTS

| | | | |
|---|---|---|---|
| 7,090,067 B2 * | 8/2006 | Schiesser | B65G 15/22 198/395 |
| 7,552,815 B2 * | 6/2009 | Pahud | B65G 21/2036 198/394 |
| 8,205,738 B1 | 6/2012 | Fourney | |
| 10,144,590 B2 * | 12/2018 | LaPierre | B65G 47/244 |
| 2007/0068772 A1 * | 3/2007 | Bahr | B65G 47/2445 198/461.2 |
| 2012/0228085 A1 * | 9/2012 | Sjogren | B65G 47/2445 198/415 |
| 2016/0200525 A1 | 7/2016 | Coullery | |
| 2018/0057271 A1 * | 3/2018 | Vitalini | B07C 1/06 |

FOREIGN PATENT DOCUMENTS

| | | |
|---|---|---|
| EP | 1180484 A2 | 2/2002 |
| EP | 1205410 A1 | 5/2002 |
| GB | 2144698 A | 3/1985 |
| WO | 04039706 A1 | 5/2004 |
| WO | 08075319 A2 | 6/2008 |

* cited by examiner

DEVICE AND METHOD FOR ORIENTING PACKAGES

RELATED APPLICATIONS

This is the national-stage entry under 35 USC 371 for international application PCT/EP2018/073591, filed on Sep. 3, 2018, which claims the benefit of the Sep. 8, 2017 priority date of German application 10-2017-120-730.9, the contents of which are herein incorporated by reference.

FIELD OF INVENTION

The invention relates to a method and device for rotating packages in a container treatment system.

BACKGROUND

In a container-treatment system, a transport device often brings a package from one workstation to another. The process of transporting the package often requires rotating the package so that it is in the correct orientation relative to the transport device.

SUMMARY

The invention provides a method and a device for the rotating of packages in a container-treatment system in such a way as to orient a package into a desired setpoint orientation with considerable precision.

In one aspect, the invention features a method for rotating packages that are making their way through a container-treatment system. The method comprises the steps of transporting at least one, and preferably several packages simultaneously, on a transport device or transporter, carrying out of a first rotation of the package or packages using the transporter's double conveyor, detecting an actual orientation of a first package using a monitoring device, or "monitor," comparing the actual orientation of the first package with a predetermined setpoint orientation, identifying a deviation of the actual orientation from the setpoint orientation, actuating the transport device, and performing a second rotation of the first package to compensate for the deviation.

The foregoing method makes it possible to precisely orient the package so that downstream devices that work with the package and that expected the package to be in a particular orientation will function correctly.

As used herein, term "simultaneous" means that several packages are being transported at the same time by the transporter, and in particular, by its double conveyor. The transporter transports packages continuously in only one transport direction and optionally rotates the packages while transporting them. In preferred practices, no transport in a direction opposite the transport direction takes place. However, there is a possibility of pausing the transport.

As used herein, the term "packages" means groups of containers that are connected to each other, either by adhesive, by a film, by a band, or any similar structure, or a collection device, such as a box or tray. In typical embodiments, the containers that are grouped together to form packages are food or beverage containers, and in particular, bottles that are made of glass or plastic.

In some embodiments, the first rotational movement is a rotation towards the setpoint orientation. The first rotation is caused by a difference between the speeds of the two conveyor belts that form the double conveyor.

The package rotates about a package-rotation axis that is perpendicular to the double-conveyor's surface. In most cases, the containers that make up the package stand upright during transport with their bases facing the double-conveyor's surface. As a result, the container axes are parallel to the package-rotation axis.

Some practices of the method include transporting and rotating several packages simultaneously on the double conveyor. In such practices, the double conveyor carries out the first rotation on all packages being transported on it.

In some practices of the method, the monitor detects a single package. In such practices, the comparison of the orientation with the setpoint orientation, the determination of a deviation, and the actuation of the transport device are all carried out on the basis of the data from this single package.

The transporter uses conveying units such as transport belts, transport chains, roller transporters, or the like. In a particular practice of the method, the double conveyor comprises at least two conveyor belts that are arranged next to one another and that can be operated to transport at different speeds so as to cause the packages thereon to rotate. This speed differential causes packages to rotate while the transporter is moving them.

To promote the ability to rotate all the packages, it is useful to place the package so that the surface area of its base is evenly split between the two conveyor belts. This can be achieved by using a centering unit to guide the package onto the conveyor.

In some practices, the monitor is an optical system, such as a camera-based system. Such a system provides, for example, an image of the package and, if appropriate, parts of the transporter.

The data provided by the monitor, for example, the image, is then used to determine the orientation of the package on the transporter, and in particular, on the double conveyor. This orientation is the rotation angle of the package, which is the angle that a package axis of the package makes relative to a centerline of the double conveyor. This angle is referred to as the "actual orientation." The "setpoint orientation" is another angle, which corresponds to the desired angle that the package axis of the package makes with the centerline.

Instead of the centerline, the reference for determining the extent of rotation can be the package's angle at the inlet relative to the side of the double conveyor. The actual orientation thus determined is then compared with a setpoint orientation to determine a deviation Other practices include carrying out a direct comparison with a predetermined setpoint orientation. In that case, it is not necessary to determine absolute rotational movement or absolute position on the double conveyor. Instead, one relies on the deviation from the actual orientation from the setpoint orientation. In such practices, the deviation is a difference between the actual rotation angle and the setpoint rotation angle of the package.

A controller controls rotation by selectively actuating the transporter. The controller receives information concerning deviation, and, in some practices, also the actual orientation and the setpoint orientation. The controller then causes a speed differential between the two conveyor belts.

Some practices rely on having two conveyors in series, both of which are double conveyors. In such embodiments, the controller controls first and second rotations of a package by causing speed differentials between the conveyor belts of the first and second double conveyors The devices necessary for the comparison, determination, and actuation can be, for example, part of the monitoring device, or can also be configured in each case as separate devices or grouped into smaller units.

In a typical practice of the method, the double conveyor causes the first rotation of all packages being transported thereon and does so at the same time. In some practices of the method, the double conveyor also produces the second rotation, which is that resulting from having compared the deviation between the actual and setpoint orientations.

In the foregoing practice, the monitor detects the package that is the next package to be conveyed from the double conveyor to either a further constituent part of the transporter or to a further component of the container treatment system. In response, the controller interrupts the first rotation, which is being carried out by the the double conveyor. The controller then causes the double conveyor to carry out a second rotation, the selection of which is informed the actual orientation, which has just been detected by the monitor. Naturally, all the packages that are on the double conveyor at the same time will have to follow along with this second rotation.

Once the abovementioned package has left the double conveyor, the controller carries out one of two actions. In some practices, the controller automatically restores the speed differential that existed prior to the second rotation and does so by the time the monitor is able to observe the next package. In the alternative, the controller adjusts the speed differential based on the detected orientation of the package that has just left the double conveyor. This results in a compact system with high container throughput. This slowly adapts the speed differential of the double conveyor to accommodate a systematic deviation.

In some practices, a correction conveyor carries out the second rotation, which is the one that compensates for the deviation between the actual and setpoint orientations as detected on the transporter. This eliminates the need to carry out the second rotation using the double conveyor and thus increases throughput.

Such a correction conveyor, like the double conveyor, has two conveyor belts arranged next to one another, with the two conveyer belts having independently controllable speeds. A difference between the correction conveyor and the double conveyor is that the correction conveyor is much shorter. The double conveyor, after all, transports many packages at the same time. In contrast, the correction conveyor transports only one package at a time as it carries out the second rotation on that package.

In embodiments that have a correction conveyor, an intermediate conveyor further increases throughput. Preferably, the intermediate conveyor is between the double conveyor and the correction conveyor. Unlike the correction conveyor and the double conveyor, the intermediate conveyor has only one conveyor belt. The intermediate conveyor plays the role of a container buffer and does not rotate packages. and serves, for example, as a container buffer. The intermediate conveyor is preferably not configured as a rotary device.

Embodiments include those in which the detection of actual orientation is carried out on the double conveyor, those in which it is carried out an the intermediate conveyor that is between the correction and double conveyors, and those in which it s carried out on a correction conveyor. Preferably, the monitor is arranged in one of the positions disclosed herein. However, other embodiments feature more than one monitor arranged in order to carry out additional checks on orientation.

Embodiments further include those that only have a double conveyor and that dispense with the need for a correction conveyor and an intermediate conveyor. In such embodiments, the double conveyor carries out both the first and second rotations. Such an embodiment is particularly compact.

Detecting the actual orientation on the correction conveyor also promotes higher throughput. Doing so permits the double conveyor to run throughout with the same speed differential between conveyor belts and avoids delays associated with varying the speed differential.

To further increase throughput, it is possible to monitor a package while the package is being transported on an intermediate conveyor that is arranged between the double conveyor and the correction conveyor. This avoids the need for a separate detection procedure on the correction conveyor. As a result, the correction conveyor carries out the second rotation directly. An additional benefit of such a configuration is that of being able to have a significantly shorter correction conveyor.

The device can accordingly be configured in accordance with the three preferred positions for the monitoring device. With an arrangement of the monitoring device at the double conveyor, it is possible, if appropriate, to do without an intermediate conveyor and/or a correction conveyor. With the arrangement of the monitoring device at the correction conveyor, the device in particular does not comprise any intermediate conveyor, but the correction conveyor and the double conveyor are arranged directly adjacent to one another. With the arrangement of the monitoring device at the intermediate conveyor, the device then comprises the double conveyor, the intermediate conveyor, and the correction conveyor.

According to a further embodiment of the invention, an automatic orientation correction is carried out, in which the deviations of the actual orientation from the setpoint orientation of the individual packages are detected and analyzed over a predetermined period of time, and in which, in the event of the occurrence of a systematic deviation, the first rotational movement of the packages is adjusted automatically, in particular without manual intervention by operating personnel.

Systematic deviation is understood to mean at least deviations or deviation tendencies that resemble one another, which repeat with the individual packages; i.e., over a predetermined period of time X, with all the packages or a specific percentage of the packages the same or a very similar deviation occurs. This can relate, for example, to a rotation angle and/or a rotation angle orientation, which occurs repeatedly. Such repeated deviations can occur due to negative interference values, such as, for example, advanced chain or belt-wear, or changing circumstances with belt lubrication. These can also, for example, be package-specific.

As soon as a systematic deviation occurs, corresponding to a predetermined definition, the automatic orientation correction is carried out automatically and without manual intervention by operating personnel, and the speed difference between the guide units of the double conveyor is adjusted to the systematic deviation. The adjustment is carried out in such a way that the systematic deviation is either fully compensated for, or at least is only still present in a much reduced degree.

According to a further embodiment of the invention, for detecting the systematic deviation an actual orientation of the packages is determined by means of at least one monitoring device and is taken into account in the analysis of the systematic fault.

The monitoring system is arranged in particular at the double conveyor and in the transport direction upstream of the first monitoring device. In particular, the monitoring system can be arranged in the inlet area of the double conveyor, such that the orientation of each package is determined at the inlet onto the double conveyor. The monitoring system can be used, for example, during the analysis of a systematic error, to determine the absolute rotation angle of the package, i.e. the rotation angle between the detection of the monitoring system and of the monitoring device, for example. As a result, it can be determined, for example, whether a systematic deviation is occurring due to the speed difference of the two conveyor belts of the double conveyor, or, for example, a belt lubrication of the conveying units, or whether, for example, there is a fault in the area of the inlet of the package onto the double conveyor.

The underlying object of the invention is further solved by a device for rotating packages in a container treatment system, with a transport device which comprises a double conveyor, which in turn is configured for the simultaneous transport and carrying out of a first rotational movement of the packages, a monitoring device for detecting an actual orientation of at least one of the packages, an assessment unit, which is configured so as to compare the actual orientation of the detected package with a setpoint orientation and to determine any deviation, a controller, which is configured such as to actuate the transport device and to arrange for a second rotational movement of the package which will compensate for the deviation from the setpoint orientation.

The device according to the invention allows for the positioning accuracy of the packages to be substantially increased, with the package throughput through the device remaining the same. This is achieved in particular by the detecting of the package by the monitor, the ACTUAL-SETPOINT comparison, and, based on that, the second rotational movement of the package.

In this situation, the second rotational movement of the package can be produced, for example, by the double conveyor. For particular preference, however, the transport device comprises a correction conveyor, which is configured to carry out the second rotational movement of the package. The correction conveyor corresponds in its structural design, for example, to the double conveyor, and likewise comprises two conveying units arranged next to one another, which can be driven with a difference in speed. It is however designed to be perceptibly shorter in its structural length than the double conveyor, since, in particular, there is always only one single package being simultaneously transported and rotated on it, while on the double conveyor there are preferably a plurality of packages being transported and rotated simultaneously.

In order to increase the throughput speed of the packages through the device still further, provision is made, according to a further embodiment of the invention, for the transport device to comprise an intermediate conveyor arranged between the double conveyor and the correction conveyor. The intermediate conveyor is configured in particular as an individual conveyor, i.e. it comprises one single conveyor belt. In the transport direction of the device it is arranged in particular between the double conveyor and the correction conveyor, and is delimited with a first end at the double conveyor and with a second end, opposite the first end, at the correction conveyor.

The monitoring device can be arranged at different positions on the device. For particular preference, however, for detecting the actual orientation the monitoring device is arranged in the region of the double conveyor, the correction conveyor, and/or of the individual conveyor. The arrangement in the region of the double conveyor allows for a particularly compact device, since if necessary an intermediate conveyor and/or a correction conveyor can be done without. Conversely, the arrangement in the region of the correction conveyor without an intermediate conveyor allows for a higher throughput speed of the packages through the device, since the double conveyor travels exclusively with a speed difference, and the detection of the actual orientation is restricted to the correction conveyor.

A further increase in the throughput speed is achieved in particular by the arrangement of the monitoring device in the region of the intermediate conveyor, since the second rotational movement produced by the correction conveyor can be carried out immediately with the transfer of the package onto the correction conveyor, and there is no need for a detection of the package. It is to be that preferably the arrangement is of the double conveyor alone, of the double conveyor with a correction conveyor, or the arrangement of the double conveyor with double conveyor and correction conveyor, wherein preferably a monitoring device is also arranged in each case, namely either at the double conveyor, at the correction conveyor, or at the delivery conveyor.

In order to improve the precision of the first rotational movement on the double conveyor, an automatic orientation correction can be carried out. During this, the deviations of the package which have been detected will be analyzed for systematic deviations. Inasmuch as a systematic deviation in accordance with a predetermined definition is present, the speed difference of the conveyor belts of the double conveyor will be adjusted automatically and without intervention by operating personnel, such that the numbers of the systematic deviation and/or the size of the systematic deviation will be reduced or entirely compensated. For the analysis of a systematic deviation, for particular preference a correction device is arranged, which provides the acquired data to the monitoring device and/or to the assessment device. In addition, the correction is in particular in connection with the controller, which is configured for the actuation of the double conveyor.

According to a further embodiment of the invention, in particular for the analysis of a systematic deviation, a monitoring system is arranged for detecting the actual orientation of one of the packages, which is configured in particular for detecting the actual orientation on the double conveyor. In this situation, the monitoring system is positioned in particular in such a way that the package is preferably detected in the inlet region of the double conveyor. The monitoring system can in principle correspond to the monitoring device. Accordingly, the monitoring system can also be configured as an optical system, in particular as a camera-based system. Usually, however, the monitoring system does not need any devices for the comparison, determination, or actuation, but provides the measured data (such as images), which it has detected, to the evaluation device and/or to the correction device provided in order identify a systematic deviation.

The correction device can be configured, for example, as being of one part with the monitoring system of the monitoring device, of the evaluator, and/or of the controller.

Although a number of aspects have been described in comparison with a device, it is understood that these aspects also represent a description of the corresponding method, such that a block element or a structural element of a device is also understood to be a corresponding method step or as a feature of a method step. By analogy, aspects that have been described in connection with, or as, a method step, also represent a description of a corresponding block or detail or feature of a corresponding device. Some or all of the method steps can be carried out by hardware, or with the use of hardware, such as, for example, a microprocessor, a programmable computer, or an electronic circuit. With some exemplary embodiments, several or more of the most important method steps can be carried out by such hardware.

BRIEF DESCRIPTION OF THE DRAWINGS

The invention is described in greater detail hereinafter on the basis of exemplary embodiments, in which.

DETAILED DESCRIPTION

Figure 1:
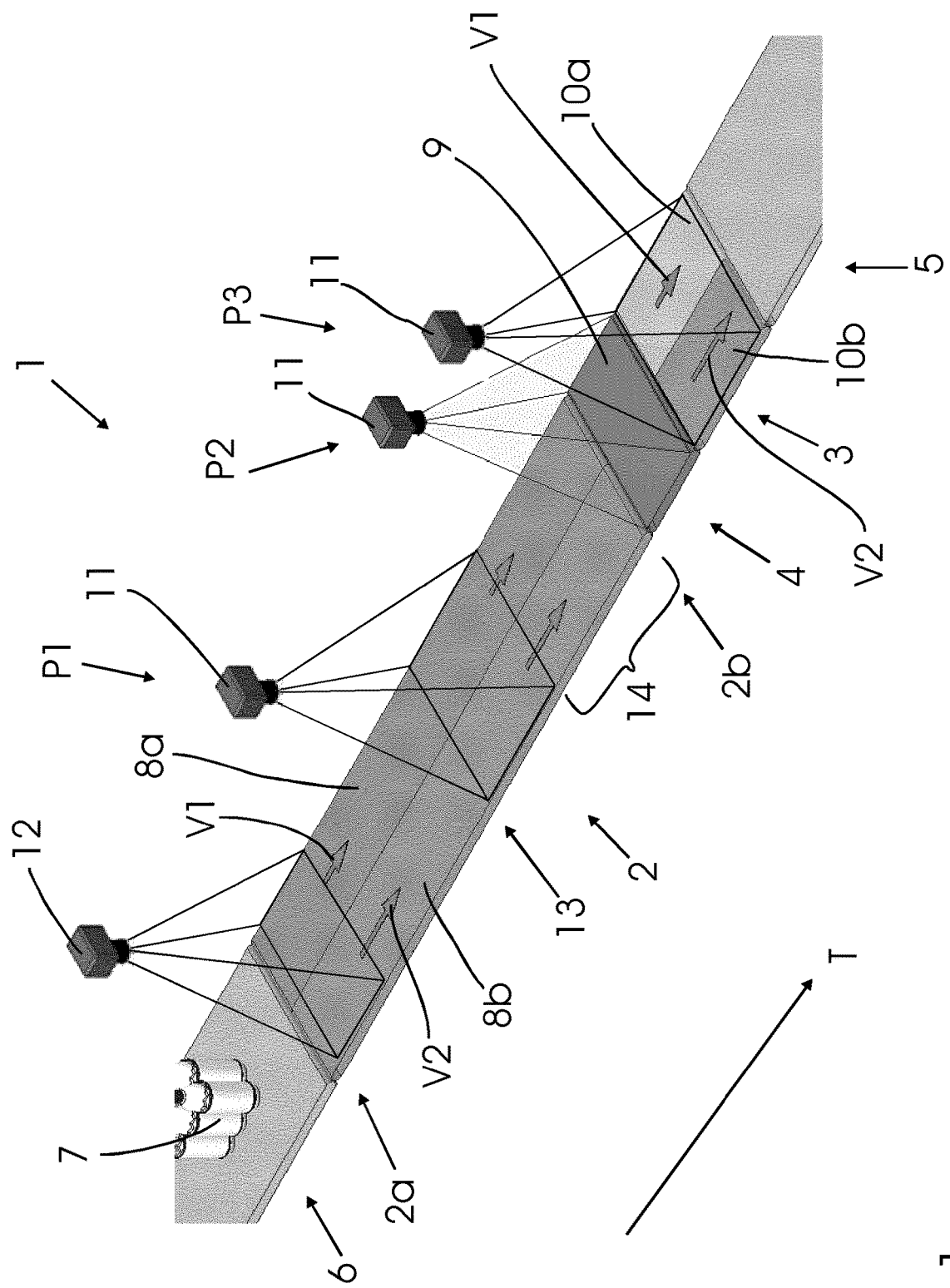
FIG. 1 shows an embodiment of the apparatus.

FIG. 1 shows a section of a transporter 1 that forms part of a container-treatment system, the remaining constituents of which have been omitted for clarity. The transporter 1 comprises a double conveyor 2, a correction conveyor 3, and an intermediate conveyor 4. The intermediate conveyor 4 is disposed between the double conveyor 2 and the correction conveyor 3.

A delivery conveyor 6 brings packages 7 to the double conveyor 2. A discharge conveyor 5 takes packages 7 away. Each package 7 consists of six containers connected together to form a rectangular footprint.

The double conveyor 2 includes adjacent first and second conveyor belts 8a, 8b that convey in a transport direction T at corresponding first and second speeds V1, V2, which can be different or the same. The different arrow lengths in the drawing indicate different speeds, with the longer arrow indicating the higher of the two speeds.

In the illustrated embodiment, the intermediate conveyor 4 has been implemented using a single conveyor belt 9.

In contrast, the correction conveyor 3 has been implemented using first and second conveyor belts 10a, 10b that are aligned with and also operable with the corresponding adjacent first and second conveyor belts 8a, 8b of the double conveyor 2.

As shown in the figures, the correction conveyor 3 is appreciably shorter than the double conveyor 2. The correction conveyor 3 and the intermediate conveyor 4 transport only one package 7 at a time. In contrast, the double conveyor 2 transports and rotates plural packages 7 simultaneously.

The various conveyors and conveyor belts described herein are implemented as belt or band conveyors. However, in alternative embodiments, the various conveyors and conveyor belts are implemented in other forms, including as chain conveyors.

FIG. 1 also shows plural monitoring devices 11 and an optional monitoring system 12. The monitoring devices 11 are disposed at corresponding first, second, and third positions P1, P2, P3. The monitoring system 12 is disposed at a container inlet 2a of the double conveyor 2. An alternative embodiments features only a single monitoring device 11, which is disposed at one of the first, second, or third positions P1, P2, P3

A monitor 11 at the first position P1 is able to detect a package 7 that is being transported on the double conveyor 2. A particularly useful place for the first position P1 is in the region between a midline 13 of the double conveyor 2 and the end of the double conveyor 2. A monitor 11 at the second position P2 is able to detect a package 7 on the intermediate conveyor 4. Finally, a monitor 11 at the third position P3 is able detect a package 7 on the correction conveyor 3.

The optional monitoring system 12 improves the precision with which the package 7 can be located. In particular, the monitoring system 12 makes it possible to determine package's starting position at the double conveyor's container inlet 2a. Additionally, because the distance between the first monitor 11 and the monitoring system 12 is known, it is possible to determine an absolute value for the package's rotation as it rotates between the monitoring system 12 and the first monitor 11 in response to the movements of the double conveyor 2.

Figure 2:
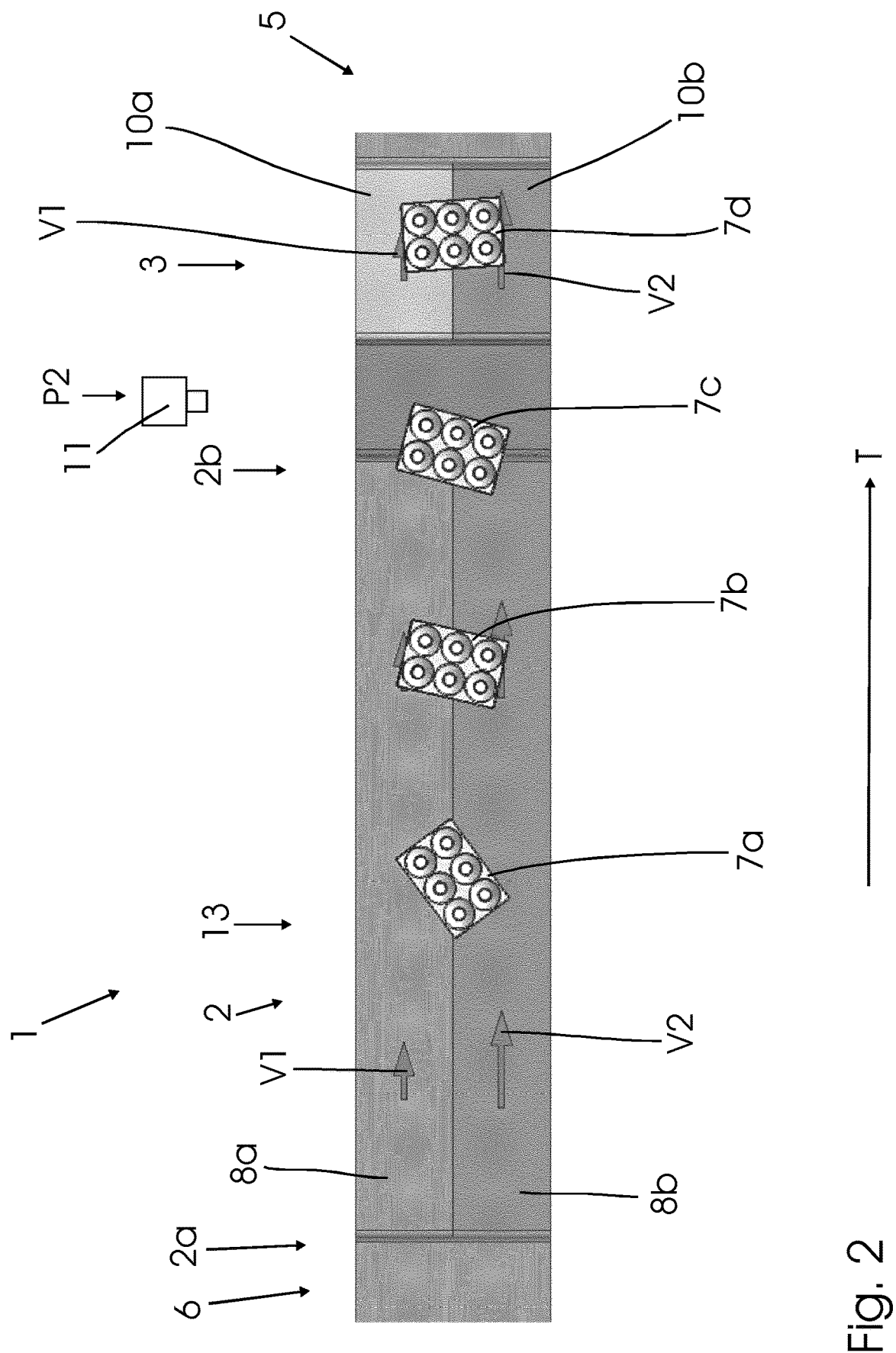
FIG. 2 shows a view from above the apparatus shown in FIG. 1 during the transport and rotation of several packages.

FIG. 2 shows a section of a transporter 1 for carrying out rotation. In the transporter 1, a delivery conveyor 6 leads into a double conveyor 2. The double conveyor 2 ends at the beginning of an intermediate conveyor 4, which continues on to a correction conveyor 3 that discharges into a discharge conveyor 5.

FIG. 2 also shows first, second, third, and fourth packages 7a-7d being transported simultaneously. The first and second packages 7a, 7b are on the double conveyor 2. A third package 7c has just being moved from the double conveyor 2 onto the intermediate conveyor 4.

Because the second conveyor 8b is moving faster than the first conveyor 8a, the first and second packages 7a, 7b have a tendency to rotate counter-clockwise about a vertical longitudinal axis as they move in the transport direction T.

The fourth package 7d is on the correction conveyor 3. The correction conveyor 3 also has two conveyor belts 10a, 10b that can move at different speeds V1, V2. As a result, the correction conveyor 3 is able to rotate the fourth package 7d in the same way that the double conveyor 2 rotates the first and second packages 7a, 7b.

The monitor 11 at the second position P2 detects the actual rotational angle of the package at the intermediate conveyor 4. An assessor 14, which is not shown, receives the angle as determined by the monitor 11 and compares it with a desired rotational angle, referred to herein as the "setpoint angle." The setpoint angle represents the angle that at which the package is intended to be oriented when it is on the intermediate conveyor 4.

The assessor 14 provides a correction signal to a controller 16. This correction signal causes the controller 16 to control the speeds V1, V2 of the first and second conveyor belts 10a, 10b of the correction conveyor 3 in such a way that the package 7 located on the correction conveyor 3 carries out a second rotational movement that rotates the package toward the setpoint angle.

In an alternative embodiment, a monitor 11 at the third position P3 detects a package 7d standing on the correction conveyor 3. In this embodiment, there is no need for an intermediate conveyor 4. The remainder of the operation is as described in connection with the first embodiment.

Another embodiment features a monitor 11 at the first position P1. In this position, the monitor 11 detects one of the packages 7a-7d that are simultaneously being transported on the double conveyor 3. In particular, the monitor 11 detects the package that is next in line to be transferred from the double conveyor 3 to a component that follows the double conveyor, such as another conveyor.

In this third embodiment, detection of a discrepancy between the actual orientation and the setpoint orientation causes the adjustment of the relative speeds V1, V2 of the conveyor belts 8a, 8b so as to reduce this discrepancy in the remaining time during which that package will be on the double conveyor 3. In this embodiment, all packages that happen to be on the double-conveyor 3 will be rotated in the same way at the same time.

The first position P1 and the detection of one of the packages 7a-7d on the double conveyor 2 are matched to one another in such a way that the package 7a that follows the detected package 7b is the only one detected and the speeds V1, V2 of the conveyor belts 8a, 8b are only adjusted as soon as the first detected package 7b has completed its second movement and/or has left the double conveyor 2. This prevents the first detected package 7b from undergoing a further rotation that would would otherwise bring it out of its setpoint orientation.

Some of the foregoing embodiments include an additional monitor 11 associated with either or both a correction conveyor 3 and an intermediate conveyor 4. Such embodiments are able to carry out a second check on actual orientation and to cause additional corrective rotation of the relevant package. This further increases the extent to which the package can be accurately positioned.

In some cases, there exists a systematic deviation in connection with feeding the packages. As a result, all packages arrive at the double conveyor 2 with similar rotation errors. To take advantage of this systematic deviation, certain embodiments analyze the orientations of incoming packages 7a-7d to identify the existence of a systematic deviation and to identify which of several known systematic deviations it corresponds to. These known systematic deviations will have been stored beforehand. Thus, the pattern of orientations of incoming packages can be matched with these known and stored systematic deviations.

Upon recognizing evidence of the occurrence of a known systematic deviation, a corrector 18 adjusts the speeds V1, V2 of the conveyor belts 8a, 8b of the double belt conveyor 2 in such a way as to compensate for the systematic deviation.

Having described the invention and a preferred embodiment thereof, what is new and secured by Letters Patent is:

1. A method comprising using a transporter to either transport a first package or to simultaneously transport several packages, one of which is said first package, wherein using said transporter comprises using a double conveyor of said transporter to execute a first rotational movement of at least said first package, using a monitor, detecting an actual orientation of said first package, comparing an actual orientation of said first package with a predetermined setpoint orientation, detecting a deviation between said actual orientation and said setpoint orientation, and causing said transporter to carry out a second rotation of said first package, wherein detecting an actual orientation of said first package comprises detecting said actual orientation while said first package is on an intermediate conveyor that is disposed between said double conveyor and a correction conveyor.

2. The method of claim 1, wherein said double conveyor comprises adjacent conveyor belts and using said double conveyor to execute said first rotational movement comprises causing said adjacent conveyor belts to have different velocities.

3. The method of claim 1, wherein causing said transporter to carry out said second rotation comprises using said double conveyor to compensate for said deviation.

4. The method of claim 1, wherein causing said transporter to carry out said second rotation comprises using a correction conveyor to compensate for said deviation.

5. The method of claim 1, wherein detecting an actual orientation of said first package comprises detecting said actual orientation while said first package is on said double conveyor.

6. The method of claim 1, wherein detecting an actual orientation of said first package comprises detecting said actual orientation while said first package is on a correction conveyor that follows said double conveyor.

7. The method of claim 1, further comprising analyzing orientations of packages during a predetermined period of time and, based on said analysis and identifying a systematic deviation of said orientations from said setpoint orientation, wherein carrying out a first rotational movement of at least said first package comprises carrying out said rotation automatically based on said identified systematic deviation.

8. The method of claim 1, further comprising identifying a systematic deviation of packages based at least in part on actual orientations of said packages as determined by a monitoring system.

9. An apparatus for rotating packages in a container treatment system, said apparatus comprising a transporter and a monitor, wherein said transporter comprises a double conveyor that is configured for simultaneously transporting one or more packages and causing a first rotation of said one or more packages, said one or more packages including a first package, wherein said monitor detects an actual orientation of at least said first package, wherein a deviation between said actual orientation and a setpoint orientation is identified and said transporter is actuated to cause a second rotation of said first package, wherein said second rotation compensates for said deviation, wherein said monitor is disposed to monitor packages on an intermediate conveyor that is between said double conveyor and a correction conveyor, said correction conveyor being configured to carry out said second rotation.

10. The apparatus of claim 9, wherein said transporter comprises a correction conveyor that is configured to execute said second rotation.

11. The apparatus of claim 9, wherein said transporter comprises a correction conveyor and an intermediate conveyor, wherein said intermediate conveyor is disposed between said double conveyor and said correction conveyor, and wherein said correction conveyor is configured to carry out said second rotation.

12. The apparatus of claim 9, wherein said monitor is disposed to monitor packages on said double conveyor.

13. The apparatus of claim 9, wherein said monitor is disposed to monitor packages on a correction conveyor that is configured to execute said second rotation.

14. The apparatus of claim 9, further comprising a monitoring system that is arranged to detect an actual orientation of said one or more packages.

15. An apparatus for rotating packages in a container treatment system, said apparatus comprising a transporter and a monitor, wherein said transporter comprises a double conveyor that is configured for simultaneously transporting one or more packages and causing a first rotation of said one or more packages, said one or more packages including a first package, wherein said monitor detects an actual orientation of at least said first package, wherein a deviation between said actual orientation and a setpoint orientation is identified and said transporter is actuated to cause a second rotation of said first package, wherein said second rotation compensates for said deviation, and wherein a systematic deviation is identified and oriented of said packages is automatically corrected based on said systematic deviation.

\* \* \* \* \*